United States Patent
Ghetie et al.

(10) Patent No.: US 7,698,457 B2
(45) Date of Patent: Apr. 13, 2010

(54) SCALABLE AND DYNAMIC QUALITY OF SERVICE CONTROL

(76) Inventors: Andrei Ghetie, 2175 Hudson Ter., #3C, Fort Lee, NJ (US) 07024; Harshad Tanna, 2-05 Pheasant Hollow Dr., Plainsboro, NJ (US) 08536; John Unger, 88 Eyland Ave., Succasunna, NJ (US) 07876; Gabor Kiss, 17 Winay Ter., Long Valley, NJ (US) 07853; Vincent Massa, 207 Maitland Ave., Paterson, NJ (US) 07502

( * ) Notice: Subject to any disclaimer, the term of this patent is extended or adjusted under 35 U.S.C. 154(b) by 1470 days.

(21) Appl. No.: 10/706,796

(22) Filed: Nov. 12, 2003

(65) Prior Publication Data

US 2005/0114541 A1 May 26, 2005

(51) Int. Cl.
*G06F 15/173* (2006.01)
(52) U.S. Cl. .................. 709/238; 709/223; 709/224; 709/226; 709/232; 370/235; 370/352
(58) Field of Classification Search ............... 709/203, 709/223, 224, 226, 228, 229, 232, 234, 238; 370/235, 352
See application file for complete search history.

(56) References Cited

U.S. PATENT DOCUMENTS

| | | | | |
|---|---|---|---|---|
| 6,466,984 | B1 * | 10/2002 | Naveh et al. | 709/228 |
| 6,862,291 | B2 | 3/2005 | Talpade et al. | |
| 7,050,396 | B1 * | 5/2006 | Cohen et al. | 370/235 |
| 7,466,690 | B2 * | 12/2008 | Schrodi | 370/352 |
| 7,478,161 | B2 * | 1/2009 | Bernet et al. | 709/228 |
| 2006/0039381 | A1 * | 2/2006 | Anschutz et al. | 370/395.21 |

* cited by examiner

*Primary Examiner*—Ario Etienne
*Assistant Examiner*—Barbara N Burgess

(57) ABSTRACT

Applications and users dynamically make QoS provisioning requests for individual traffic flows traversing client and server hosts. A traffic flow provisioning request is conveyed to a services manager, which determines a set of traffic attributes for the flow and determines the networks the flow traverses between the client and server hosts. The services manger then oversees the admission of the flow to appropriate traffic classes in each determined network and the obtaining of a DSCP value for each network. Lastly, the services manger conveys the DSCP value of the first network traversed back to the client or server host, depending on the direction of the flow, which host is then configured to appropriately mark the DSCP field of the traffic flow packets. In a further embodiment, the services manager also instructs the client or server host to perform packet policing and shaping for the flow.

13 Claims, 7 Drawing Sheets

SCALABLE AND DYNAMIC QUALITY OF SERVICE CONTROL

GOVERNMENT LICENSE RIGHTS

This invention was made with Government support under agreement No. F30602-00-C-0009 awarded by the Air Force Research Laboratory and agreement Nos. DASG60-01-C-0058 and DASG60-00-C-0060 awarded by the U.S. Army Space and Strategic Defense Command. The Government has certain rights in this invention.

FIELD OF THE INVENTION

Our invention relates generally to application and user control over network quality of service for application sessions. More particularly, our invention relates to methods and systems for scalable, dynamic, end-to-end, quality of service control within a data network on a per application traffic flow basis.

DESCRIPTION OF THE BACKGROUND

Users have an increasing need to dynamically prioritize the individual traffic flows of application sessions traversing IP (Internet Protocol) based networks, such as enterprise networks and VPN-type services provided by Internet Service Providers. An application session, for the purposes of this discussion, is a connection between any given instance of a client application and a server application, wherein the session comprises one or more individual traffic flows. The need to prioritize traffic flows exists because networks are carrying increasingly diverse traffic types that all compete for network resources. When a given traffic flow has particular bandwidth, latency, and packet loss requirements (i.e., particular quality of service (QoS) needs), other network traffic can consume network resources and thereby adversely affect the flow. Network administrators will typically use Diff Serv (differentiated services) enabled networks to allocate network resources to critical applications so that the performance needs of these application sessions are met.

Specifically, a Diff Serv enabled network allows heterogeneous traffic types from different application sessions to co-exist while at the same time allocating these varying traffic types different network resources based on the needs of the application. As indicated, some traffic types have bandwidth, latency, and packet loss requirements that the total mix of traffic on a network can adversely affect. Diff Serv allows a network administrator to establish traffic classes in the network by allocating network resources to each class. (In general, traffic classes are established by configuring the network routers to support varying packet queuing and forwarding techniques and thereby providing different throughput, latency, and loss services for each class). Application sessions are then assigned to these classes and are thereby generally able to receive a certain quality of service.

Traffic classes are not specific to any given user, application, or session. Rather, any given traffic class will typically carry data packets from many different applications originating from many different users. In particular, edge routers of the network (or a dedicated hardware coinciding with the router) assign packets from application sessions to traffic classes. The edge routers analyze each packet as it enters the network, classifying the packet according to an assigned traffic class, and insert a specific Differentiated Services Code Point (DSCP) value in the DSCP field of the packet based on the assigned traffic class. The network routers use a packet's DSCP value to process the packet according to the assigned traffic class. The edge routers also typically condition the traffic before forwarding it into the network. Traffic conditioning includes packet shaping, dropping, and policing. Policing ensures that any given application session does not utilize more bandwidth than associated with the assigned service. Importantly, for edge router performance reasons, the network administrator typically configures the edge routers to assign traffic flows to traffic classes on an application and site basis. In other words, all traffic flows from a given application session from a set of designated sites are assigned to the same traffic class.

Although the traditional approaches to Diff Serv can provide critical applications with the required resources to the meet the application needs, these approaches have several drawbacks. In particular, there are an increasing number of application sessions that users want to prioritize. At the same time, however, very often only a particular traffic flow from a given session requires prioritization. Similarly, users often want to dynamically decide when a given application session receives prioritized service and when it does not. However, typical Diff Serv approaches are not sufficiently scalable and dynamically configurable to meet the increasing number of applications sessions and individual user needs. Another issue is that Diff Serv approaches are often susceptible to unpredictable traffic loads.

More specifically, the assignment of application sessions to traffic classes is static under Diff Serv. Once a network administrator configures the edge routers to mark specific application packets, all application sessions for that application from a set of designated sites are assigned to the given traffic class and these configurations are essentially static. This is problematic because in any given instance, a user may decide that a given application session requires the services of a particular traffic class and the network administrator has not configured the edge routers to assign that user to the class or, similarly, may not have assigned that given application to a traffic class. In addition, users often determine that a given session does not require the services of a given traffic class or requires a higher service. One solution to these issues is for a user to dynamically contact the network administrator for reconfiguration of the edge routers on a per need basis. However, this is both time-consuming and unusable from a user perspective and unfeasible from an administrative perspective.

A similar issue is that the network resources are limited. Accordingly, administrators must take care when configuring the edge routers to not over admit application sessions/users to the traffic classes. However, not all admitted users simultaneously run application sessions, which results in administrators essentially underestimating the number of application sessions that should be allowed access to a traffic class and thereby under-utilizing the network resources. Similarly, it is usually only a given traffic flow within a given session that actually requires the services, causing traffic classes to often carry unnecessary data packets. Accordingly, administrators should allocate network resources on a per-traffic flow basis and when specifically needed. Again, such a system is time consuming and unusable from a user perspective and unfeasible from an administrative perspective. In addition, such continuous/dynamic assignment of traffic flows to traffic classes is not scalable, which is further described below.

Similar issues exist in network environments where IP addresses are dynamically assigned through DHCP (Dynamic Host Configuration Protocol) and therefore dynamically change. In this environment, network administrators are required to constantly reconfigure the edge routers as IP addresses are re-assigned to network users or are forced to assign applications to traffic classes at a more coarse level, disregarding the individual sites. Again, quality of service is more appropriately designated on a per user/application session level.

A second issue with traditional Diff Serv approaches is that they are not scalable. On a fundamental basis, as more users are added to a network and/or as administrators increase the number of applications requesting traffic class services, the edge routers correspondingly must perform additional packet filtering/marking/conditioning/policing responsibilities. At some point, the functional ability of the edge routers is reached, thereby causing the administrators to have to add additional edge routers to the network at additional cost. Similarly, as the edge routers are configured to admit more application sessions, the internal network resources must also be increased. However, as described above, the number of application sessions simultaneously needing the network resources is usually less than the number the edge routers are configured to admit, thereby causing network administrators to over provision the network.

Similarly, as described above, quality of service is more appropriately designated on a dynamic user basis at the traffic flow level. Again, edge router performance issues will occur if routers are made to mark and condition at the traffic flow level, especially as users and applications are added to the network. In addition, continuously configuring and reconfiguring edge routers on a per user basis compromises edge router performance.

A third issue with the traditional Diff Serv approaches is admission control. Typically, when configuring network resources to establish traffic classes, an administrator approximates the number of instantaneous application sessions that will occur and the traffic classes each should be assigned to. As long as the number of simultaneous application sessions for a given traffic class does not exceed the configured approximation, each session will receive adequate resources. However, an unexpected number of sessions for a given traffic class can occur, which results in performance degradation across the class causing no session to receive adequate resources. One solution to this is to over-provision the traffic class, but this wastes network resources.

Prior solutions have only partially addressed the above issues, including systems referred to as bandwidth broker systems. A bandwidth broker is a network management system that provides admission control and bandwidth management for Diff Serv enabled networks by tracking the amount of bandwidth being used in each traffic class. When an application session requires the services of a traffic class, the application makes an admission request to the bandwidth broker, providing the bandwidth and the traffic class being requested. The bandwidth broker determines whether sufficient bandwidth is available in the respective traffic class. If there is sufficient bandwidth, the bandwidth broker decreases the amount of available bandwidth for the traffic class, and configures the appropriate edge router to mark, condition, and police the new traffic. Otherwise the new session is denied admission.

Advantageously, bandwidth broker systems prevent traffic classes from becoming over-utilized thereby preventing performance degradation; they allow for dynamic/automatic application controlled QoS management; and, they allow for better utilization of internal network resources. However, the systems have several disadvantages. First, bandwidth broker systems fail to address the scalability issues described above. While these systems are suitable for small-scale networks, edge routers are not capable, from a performance perspective, of marking/conditioning/policing numerous application sessions or worse, traffic flows, and are compromised as users increasingly make numerous configurations/reconfigurations on a dynamic basis. A second issue is that applications must be specifically designed/programmed to communicate with bandwidth broker systems and, as such, applications are not easily integrated into the framework making bandwidth broker systems difficult to use. More specifically, an application developer must understand the low-level detailed traffic attributes of the application sessions the application will generate and translate these attributes into one of the traffic classes supported by the network so that the actual traffic class request can be made to the bandwidth broker. This issue becomes worse if an application session needs to traverse several networks, each with different traffic classes and managed by different bandwidth brokers. Here, the application developer must make the traffic-attributes to traffic-class translation for each network/bandwidth broker. In addition, the developer must determine which networks a given session will traverse in order to communicate with the appropriate bandwidth brokers.

SUMMARY OF OUR INVENTION

Accordingly, it is desirable to provide methods and system that overcome the shortcomings of the prior art and allow applications and/or users of a network to dynamically provision QoS services on an individual traffic flow basis. Our invention applies to an environment where a plurality of networks interconnect client and server computers/hosts wherein each network is either a Diff Serv enabled network with pre-provisioned traffic classes or an over provisioned/congestion-free network. Each client and server computer comprises one or more client/server applications wherein any given instance of a client application establishes a session via the networks to a server application and in particular, wherein the client and/or server applications and users of these applications desire QoS services from the networks for the traffic flows moving between the clients and servers.

A first embodiment of our invention comprises a middleware module at each of a plurality of client and/or server hosts, a services control module, and one or more network control systems. Client and server applications directly interface the middleware module in order to make QoS requests. Specifically, once a client application and a server application establish a session, the client application, and similarly the server application, dynamically and automatically determines when one the given traffic flows it is generating needs QoS services from the networks and makes a QoS request to the middleware module specifying a flow identification. The middleware module conveys this request to the services module, which determines low-level traffic flow attributes for the flow based on the flow identification and determines the networks the flow traverses between the client and server hosts. Based on the determined networks, the services manager then oversees admission control of the traffic flow to these networks.

Specifically, for each Diff Serv enabled network, either a network control system or the services manager itself performs QoS admission control and bandwidth management for that network. In particular, when a network control system is associated with a network, it performs admission control for new traffic flows to the pre-provisioned traffic classes provisioned in that network. For an admitted traffic flow to a specified traffic class, the network control system returns a DSCP value corresponding to the traffic class. Similarly, the clients and servers may already have an explicit service level agreement with the provider of a network. Here, the services manager directly performs admission control over the service level agreement.

Accordingly, based on a QOS request for a given traffic flow between a client and server, the services manager maps the determined traffic flow attributes to one of the traffic classes supported by each of the determined Diff Serv enabled networks and oversees admission control to these networks by interfacing with the network control systems and/or directly. Assuming each network control system and/or the service manager can admit the new traffic flow to a traffic class of its corresponding network, each determines a DSCP value for its traffic class and returns this DSCP value to the services manager. The services manager then returns to the middleware module at the client or server, depending on the source of the traffic flow, the DSCP value corresponding to the first network the flow traverses. Upon receiving the DSCP value from the services manager, the middleware module configures the client/server to appropriately mark the DSCP field of the transmitted traffic flow packets thereby completing the overall QoS configuration.

In accordance with a second embodiment of our invention, client and server applications continue to make QoS provisioning requests for the traffic flows each directly generates. However, each application can also make QoS provisioning requests on behalf of the other. For example, a client application can make QoS requests for the traffic flows it generates and for the traffic flows a corresponding server application generates. Similar to the first embodiment, this embodiment comprises a middleware module at client and/or server hosts, a services manager, and network control systems, all of which continue to function as with the first embodiment. In addition, this embodiment also comprises a policy enforcement module at each of a plurality of the client and/or server hosts. When resident at a given host, this module performs DSCP marking configurations for the traffic flows the applications at this given host generates but wherein the module is activated by an opposing host.

As an example of this second embodiment, a client can comprise a middleware module and a server can comprise a policy enforcement module. Assume applications at the client and server have an application session with client-to-server and server-to-client flows. The client application can make a QoS provisioning request for the client-to-server flow, with the middleware module relaying the request to the services manager and with the middleware module also configuring the client with the obtained DSCP value for packet marking. In addition, the client application can also make QoS provisioning requests for the server-to-client flow. Again, the middleware module relays the request to the services manager and the services manager determines traffic attributes for the flow, determines the networks the traffic flow traverses, and oversees admission control obtaining a DSCP value. However, rather than conveying the DSCP value back to the middleware module at the client, the services manager now conveys the DSCP value to the policy enforcement module at the server. The policy enforcement module, upon receiving the DSCP value from the services manager, configures the server to intercept the traffic flow packets generated by the server application prior to transmission and to appropriately mark the DSCP field of the packets, completing the overall QoS configuration.

In accordance with a third embodiment of our invention, in addition to performing the packet marking function, the client and server hosts can also perform packet policing and packet shaping functions for the traffic flows corresponding applications generate. Similar to the first embodiment, this embodiment comprises a middleware module at the client and/or server hosts, a services manager, and network control systems, each of which continue to function the same. In addition, similar to the second embodiment, this third embodiment can also comprise a policy enforcement module at remote hosts, which again, applications at a local host use to make QoS requests for the traffic flows a remote host generates. However, in accordance with this third embodiment, this policy enforcement module, under the instruction of the services manager, also performs packet policing and packet shaping functions for the traffic flows applications at the remote host generate. In addition, in the case where an application at a local host is making QoS requests for the traffic flows it directly generates, this third embodiment adds a policy enforcement module to the local host that performs the packet policing and packet shaping functions for these traffic flows. In particular, under the control of the services manager, the middleware module at the local host continues to perform the packet marking function. However, the policy enforcement module performs the packet policing and shaping functions with respect to these flows.

In accordance with a fourth embodiment of our invention, applications can continue to directly control the QoS requests for a given application session/traffic flow; but, in addition, a user can also make QoS requests for application sessions/traffic flows, in particular, when the application itself is not able to interact directly with the middleware module. This embodiment again comprises a services manager and one or more network control systems that oversee the QoS management for the networks on behalf of the clients and servers. In addition, this embodiment comprises a signaling client and a middleware module at each of a plurality of the client and/or server hosts that operate together to allow users to make the QoS requests for client-to-server and server-to-client flows. Lastly, this embodiment comprises the policy enforcement module at the client and/or server hosts, which performs the packet marking (and policing/shaping functions) whenever the signaling client is used to initiate QoS requests.

Assuming the signaling client/middleware module are located at the client side of an application communication, a user of the client can make QoS requests for the client-to-server and server-to-client flows occurring between the client application and the corresponding server application. When a user makes a QoS request for a particular application session/traffic flow, the signaling client conveys the request to the services manager via the middleware module. If the flow is admitted, the services manager obtains a DSCP value and determines the direction of the flow. For server-to-client flows, the services manager conveys the DSCP value to a policy enforcement module at the server, which operates as above. For client-to-server traffic flows, the services manger conveys the DSCP value to a policy enforcement module at the client, which module then operates like the policy enforcement module described in reference to the second and third embodiments, configuring the client to mark the packets and possibly perform rate control functions for the client-to-server traffic flows.

DETAILED DESCRIPTION OF OUR INVENTION

Figure 1:
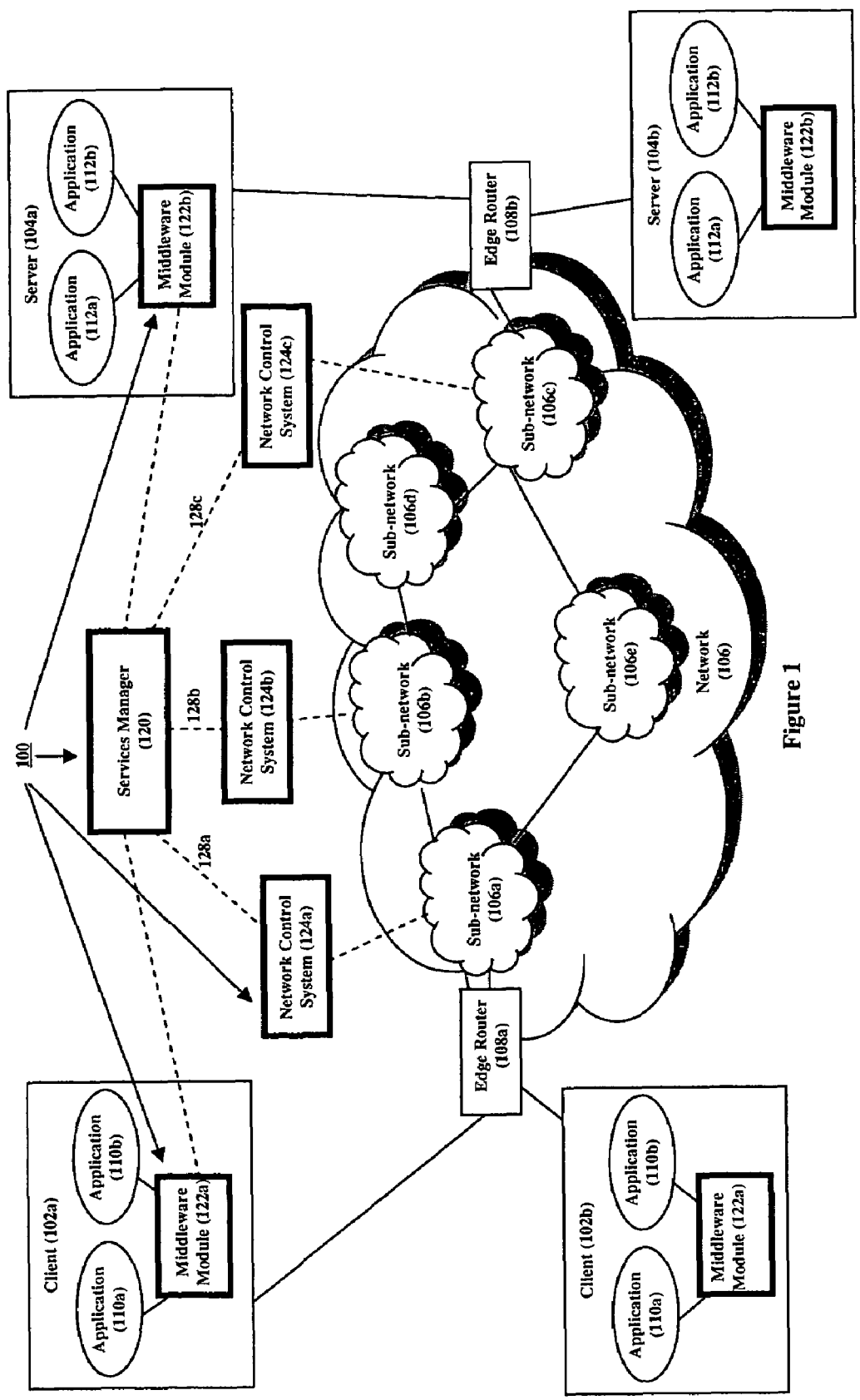
FIG. 1 depicts a block diagram of a first embodiment of our invention for provisioning QoS services on a per traffic flow basis, wherein the invention comprises a middleware module, a services manager, and network control systems and wherein client and server applications communicate with the middleware module to directly make the provisioning requests.

FIG. 1 is a high-level illustrative diagram of a first embodiment of system 100 of our invention that provisions end-to-end QoS services on a per application traffic flow basis. Specifically, system 100 allows an application to dynamically, automatically, and flexibly request that the traffic flow(s) of a given session generated by the application be assigned QoS services and then provisions the assignment, freeing the application from the details of this provisioning. System 100 comprises a services manager 120, a middleware module 122a and 122b at client computers (102) and server computers (104) respectively, and one or more network control systems 124a-c.

As FIG. 1 shows, system 100 applies to an environment comprising a plurality of client computers 102a-b and server computers 104a-b interconnected by a network 106 through a set of edge routers 108a-b. (Note that the client and server computers are hereinafter generically referred to as hosts.) Each client and server site comprises one or more client/server applications 110a-b/112a-b wherein any given instance of a client application establishes a connection/session via network 106 to a server application and in particular, wherein the client or server application desires QoS services from network 106 for the traffic flows moving between the client and server.

Network 106 may reside within a single administrative domain or may comprise a plurality of interconnected sub-networks 106a-106e as shown in FIG. 1, with each sub-network under separate administrative control. Each sub-network 106a-106e is presumed to be either a Diff Serv enabled network, such as sub-networks 106a-d, with statically defined pre-provisioned traffic classes (i.e., the actual provisioning of the traffic classes is not particular to our invention) or an over provisioned/congestion-free network, such as sub-network 106e, with no provisioned traffic classes. While system 100 does not need to configure congestion free networks when provisioning an end-to-end QoS service for a given traffic flow, system 100 needs to be aware of these sub-networks because the given traffic flow may traverse these networks. Note also that for the Diff Serv enabled networks, each network may support different traffic classes.

Importantly, system 100 manages QoS services at the traffic flow level for any given application session between any given client and server. Hence, each time a client and a server application establish a session, system 100 allows the client and the server to control the QoS services for the traffic flows occurring over that session. Specifically, applications interact with system 100 in several ways depending on the direction of the traffic flow that requires QoS services and based on the type of traffic flow. For example, when an instance of a client application establishes a session to a server application, the client application can request QoS services for the traffic flows moving from the client to the server. Similarly, the server application can request QoS services for the traffic flows moving from the server to the client. In addition, the client and server applications can request QoS services for the life of the application session, such that all client-to-server and server-to-client traffic flows are mapped to a traffic class, or the client and server can request short-lived QoS support for short-lived traffic flows, such as bursty traffic. In this latter case, system 100 enables QoS services only for the life of the bursty traffic. Accordingly, a given application instance may make numerous QoS requests over the life of a session. Note that because system 100 allows applications to dynamically request QoS services on a per session/traffic flow basis when needed, network resources are more effectively shared/multiplexed between numerous applications overcoming network scalability issues.

In general and in accordance with this first embodiment of our invention, an instance of a client application dynamically and automatically determines when one of the given traffic flows it is generating to an instance of a server application requires QoS services from network 106 and makes a QoS request to system 100. Similarly, the server application instance also dynamically and automatically determines when one of the given traffic flows it is generating to the client application instance requires QoS services from network 106 and makes a QoS request to system 100. Upon receiving a given request for a given traffic flow, system 100 determines an appropriate traffic class supported by network 106 and determines if the traffic class has sufficient resources to support the traffic flow. If not, the QoS request is rejected. However, if there are sufficient resources, system 100 provides the client or server (depending on which host made the request) with a DSCP value corresponding to the assigned class. The client or server then proceeds to mark the packets of the traffic flow with the DSCP value and transmits the packets to network 106, where the network routers process the packets according to the corresponding traffic class associated with the DSCP value.

More specifically, once a client application 110 and server application 112 establish a session, the client and/or server application conveys its QoS requirements in the form of a QoS request to the services manager 120 via the middleware module 122a/b, which is an intermediary between an application instance and the services manager. The services manager 120 is a central entity that oversees QoS management on behalf of a group of clients 102 and servers 104 communicating over network 106. Upon receiving a QoS request from an application via a middleware module, the services manager translates the QoS request to a set of detailed traffic flow attributes, determines whether the request corresponds to a client-to-server flow or a server-to-client flow, and determines the sub-networks 106a-e the traffic flow traverses between the client and server. Based on the determined sub-networks, the services manager then contacts the appropriate network control systems 124a-c for admission control, or indirectly handles the admission control itself.

Specifically, each sub-network 106a-106e is presumed to be either a Diff Serv enabled network (106a-d) or an over provisioned/congestion-free network (106e). Traffic classes are not needed for the "congestion-free" networks and as such, admission control is not necessary for these networks. However, for each Diff Serv enabled network, either a network control system 124a-c or the services manager 120 performs QoS admission control and bandwidth management for that network. In particular, a network control system 124a-c may be associated with a sub-network (e.g., subnetworks 106a-c) and performs admission control for new traffic flows to the set of pre-provisioned traffic classes provisioned in the network. The control system takes as an input a specific traffic class configured in the network and a bandwidth requirement for a given traffic flow, determines if the traffic class has sufficient available bandwidth in light of priorly admitted traffic flows to support the new flow, and admits or denies the new flow based on the available bandwidth. For admitted traffic flows, the network control system returns to the services manager a DSCP value corresponding to the specified traffic class.

Similarly, the clients 102 and servers 104 may already have an explicit service level agreement (comprising one or more traffic classes) with the provider of a sub-network (such as network 106d). Here, the services manager performs admission control over the service level agreement on behalf of the clients 102 and server 104 to ensure these clients/servers do not attempt to exceed the agreement and degrade service amongst each other. Similar to a network configuration system, the services manager takes as input an admission request to a traffic class within the service level agreement wherein the request is for a given traffic flow with a specific bandwidth requirement. It then determines if the traffic class has sufficient available bandwidth in light of priorly admitted traffic flows to support the new flow. If there is sufficient bandwidth, the services manager returns a DSCP value associated with the traffic class.

Accordingly, based on a QOS request for a given traffic flow between a client and server, the services manager determines the sub-networks the flow traverses. For each Diff Serv enabled sub-network, the services manager maps the determined traffic flow attributes to one of the traffic classes supported by that sub-network. It then makes a QoS admission request to the appropriate network control systems 124a-c and/or makes the admission determination itself as just described. Assuming each sub-network has sufficient bandwidth to admit the new traffic flow, each network control system (and/or the service manager) determines a DSCP value for the traffic class of its corresponding network. When a client application makes the QoS request for a client-to-server traffic flow, the services manager then returns to the middleware module 122a the DSCP value corresponding to the first Diff Serv enabled sub-network the flow traverses. Similarly, when a server application makes the QoS requests for a server-to-client traffic flow, the services manager conveys to the middleware module 122b the DSCP value corresponding to the first Diff Serv enabled sub-network the flow traverses. The services manager 120 then conveys the remaining DSCP values corresponding to the remaining sub-networks to the network control systems, which use these values to configure their networks to perform packet remarking (i.e., swapping of DSCP values) at the network boundaries. Alternatively, the sub-networks can be pre-configured to automatically perform packet remarking between corresponding traffic classes of adjacent networks.

Upon receiving the DSCP value from the services manager for a client-to-server flow, the middleware module 122a configures the client 102 to appropriately mark the DSCP field of the transmitted traffic flow packets for the application session, thereby completing the overall QoS configuration. Similarly, for server-to-client traffic flows, the middleware module 122b, upon receiving the DSCP value from the services manager, configures the server 104 to appropriately mark the DSCP field of the transmitted traffic flow packets, again completing the overall QoS configuration.

As compared to prior systems, our inventive system 100 has several advantages. First, system 100 allows each instance of an application to dynamically make specific QOS requests as needed at the traffic flow level, over-coming the static configuration issues displayed by prior systems and better utilizing network resources. Second, dynamic traffic flow level QOS management overcomes the scalability issues of prior systems. Similarly, the scalability issues are overcome by performing the packet-marking functions at the clients and servers. Third, while our inventive system provides QOS admission similar to prior systems, our system further allows applications to specify QOS requirements at a high level, masking the applications from the low-level detailed traffic attributes. Similarly, our system automatically manages QOS configuration across multiple networks on behalf of applications. Reference will now be made in greater detail to the elements of our invention, beginning with the network configuration systems 124, the middleware module 122, and then the services manager 120.

Figure 3:
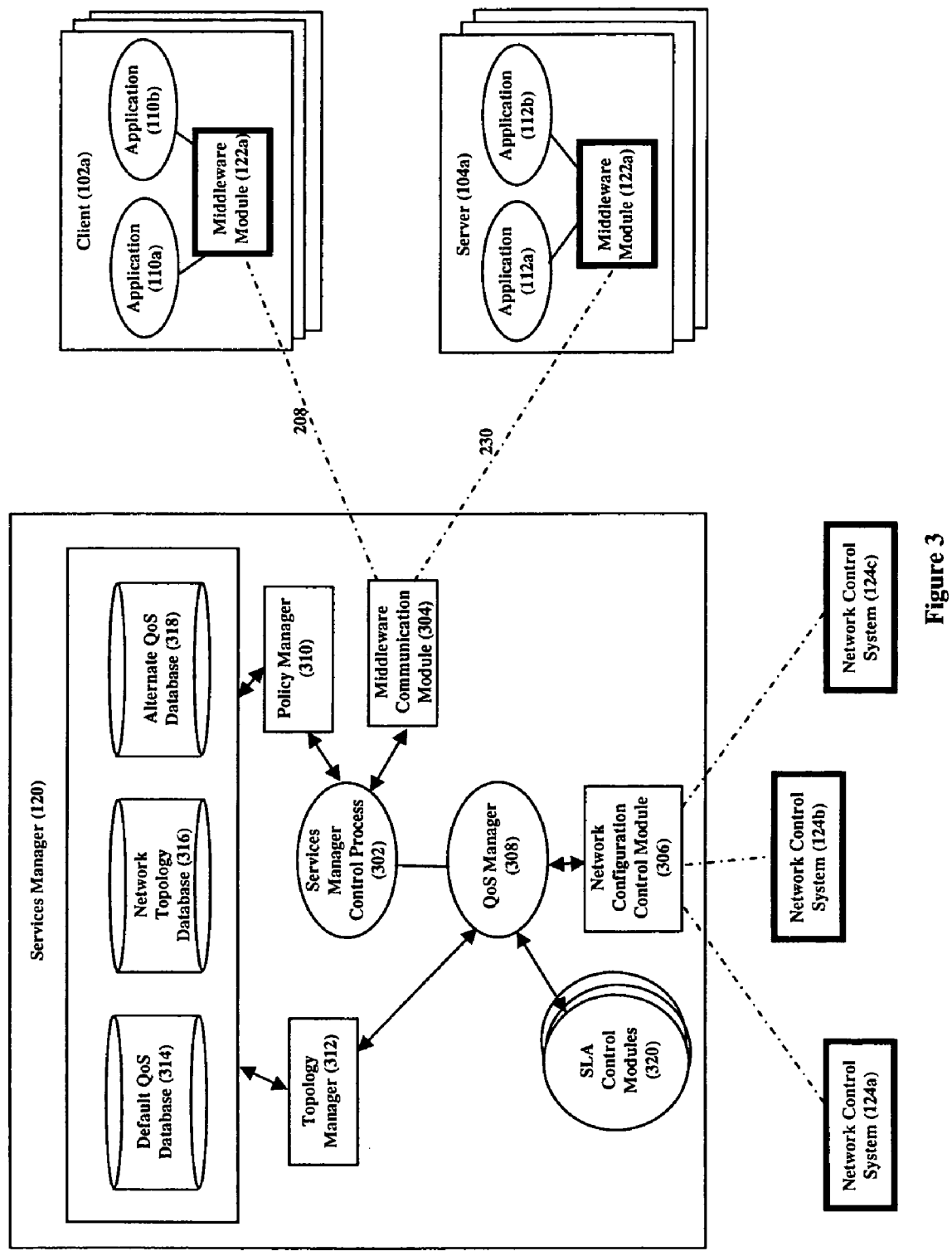
FIG. 3 is a functional drawing of the services manager as shown in FIG. 1.

As indicated, QoS admission control and bandwidth management for each Diff Serv enabled sub-network within network 106 is provided through a corresponding network configuration system 124a-c and/or by the services manager through one or more modules we refer to as the "SLA control modules" (see element 320 of FIG. 3). Each network configuration system 124a-c and the SLA control modules in system 100 operates independently of the others and each sub-network may therefore have different traffic classes provisioned and may associate different DSCP values with each class.

Beginning with the network configuration systems, each is similar to a bandwidth broker system and as such, is aware of the traffic classes provisioned in its corresponding sub-network, is aware of the DSCP values associated with each class, and is aware of the bandwidth allocated to each class. Accordingly, each network configuration system can be a modified version of the Telcordia Bandwidth Broker or a modified version of other known bandwidth broker systems. Commonly assigned U.S. patent application Ser. No. 09/829,385, "Methodology for Quality of Service Provisioning for Virtual Private Networks," which is hereby incorporated by reference, describes the Telcordia Bandwidth Broker. When the network configuration system is based on the Telcordia Bandwidth Broker, the system is software-based and can reside as a separate software process on the services manager platform 120 or as a standalone platform separate from the services manager (as shown in FIG. 1) and interconnected to the services manager through a data communications interface, such as interfaces 128a-c.

Note that unlike traditional bandwidth broker systems, the network configuration systems receive admission requests from the services manager 120 rather than the individual applications 110 and 112. The services manager, as described below, prevents application developers from having to determine which network configuration system is responsible for a given sub-network, from having to interface multiple systems when an application session traverses multiple sub-networks, and from having to map low-level traffic attributes to one of the traffic classes supported by a given sub-network.

The interface to any given network configuration system is a QoS admission request to admit a given traffic flow across the configuration system's corresponding sub-network. Specifically, for each network configuration system, the request comprises a specific traffic class supported by the corresponding sub-network, the bandwidth requirements of the traffic flow, and the IP address of the client and server between which the traffic flow is traversing. Based on the admission request, the network configuration system determines if the requested traffic class has sufficient bandwidth to support the traffic flow. If the determined class does not have sufficient bandwidth, the network configuration system informs the services manager 120 that the admission request is denied. If the determined class has sufficient bandwidth, the network configuration system admits the request by reducing the available bandwidth for that class by the amount requested. However, rather than configuring the edge routers 108*a/b* to mark the new flow, the network configuration system returns the DSCP value associated with the traffic class to the services manager. (Note that the edge routers may continue to perform policing and possibly shaping, here on a per traffic class basis. The network administrator would pre-provision the edge routers to perform this function.)

The SLA control module 320 of FIG. 3 is a component of the services manager, but is discussed now given its functional similarity to the network configuration systems. As indicated, the clients 102 and servers 104 may have service level agreements (comprising one or more traffic classes) with the providers of some sub-networks. Each of these sub-networks has a corresponding SLA control module at the services manager. Each module is software based and similar to a network configuration system in that it performs admission control over the traffic classes comprising the service level agreement for the sub-network. However, unlike a network configuration system, a SLA control module does not directly communicate with its corresponding sub-network.

Each SLA control module is aware of the traffic classes comprising the service level agreement of its corresponding sub-network, is aware of the DSCP value associated with each class, and is aware of the bandwidth allocated to each class. The request to a module comprises a specific traffic class of the service level agreement and the bandwidth requirements of the traffic flow. Based on the admission request, a SLA control module determines if the requested traffic class has sufficient bandwidth to support the traffic flow. If the determined class does not have sufficient bandwidth, the module informs the services manager 120 that the admission request is denied. If the determined class has sufficient bandwidth, the module admits the request by reducing the available bandwidth for that class by the amount requested and returns to the services manager the DSCP value associated with the traffic class.

Figure 2:
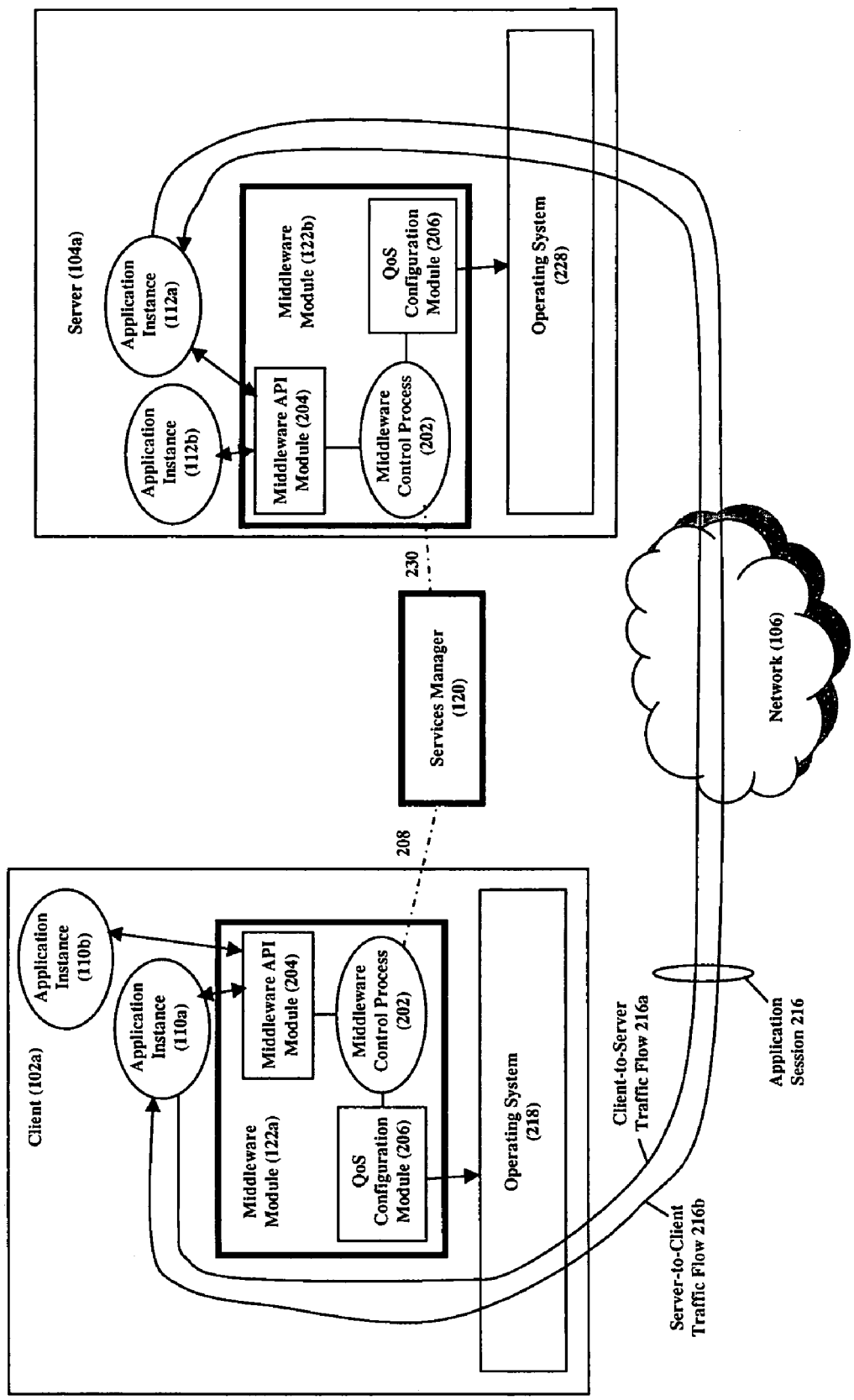
FIG. 2 is a functional drawing of the middleware module as shown in FIG. 1.

Turning to the middleware module 122, FIG. 2 shows a high level functional architecture of the module (Note that for description purposes, the middleware module is shown in FIGS. 1-7 as a single entity per host with each entity serving multiple application instances. Preferably, each application instance at a host has a corresponding independent instance of the middleware module). Note that the module 122 is identical whether located at a client 102 or a server 104. Note further that the while FIG. 2 shows the middleware module being resident at a client and a server that are a communicating, each instance of the module is independent of the other and need not be resident at both. The module need only be resident at any client or server that contains applications needing to request QoS services from network 106 for the traffic flows it generates. For example, assume client application 110*a* and server application 112*a* establish a session 216 comprising client-to-server traffic flow 216*a* and server-to-client traffic flow 216*b*. If only the client-to-server flow 216*a* requires QoS services, then only the middleware module 122*a* is needed. Similarly, if only the server-to-client flow requires QoS services, then only the middleware module 122*b* is needed.

As shown, the middleware module is software-based and comprises a middleware control process 202, which controls the QoS configurations for all traffic flows any application instance on the client or server generates, a middleware API (application programming interface) module 204, which the applications use to request QoS services from system 100, and a middleware QoS configuration module 206, which performs QoS configurations on the client or server for the traffic flows. The API is linked with the client and server applications 110*a/b* and 112*a/b* respectively and as such and in accordance with this first embodiment of our invention, application source code must be modified to interact with system 100.

In particular, once an instance of a client application and server application establish an application session, the client and/or server application uses the middleware API 204 to make QoS requests for the traffic flows it generates over the session. As indicated, an application may choose to make only one QoS request, indicating that the QoS services should last for the life of the session, or may make numerous QoS requests, each request coming prior to the sending/receiving of a particular traffic flow and indicating that the requested QoS services should be short-lived. Similarly, an application can terminate priorly requested QoS services.

When an application instance requests QoS services for a given session/traffic flow, it specifies the client's and server's IP addresses, the port numbers of the session, and an application ID/flow ID, which identify the type of application and flow. The application instance may also specify high-level traffic flow characteristics. Specifically, the application can specify the duration of the flow, the flow size, the bandwidth required, and a service class, which is a high level description of the type of data transfer (i.e., a bulk data transfer, a video transfer, etc). However, a disadvantage of the application characterizing the flow is that the description is now hard-coded in the application and not easily modified. Accordingly, the application may alternatively specify no description or only a partial description of the traffic flow. For example, the application may only specify the flow duration and flow size leaving the bandwidth and service class unspecified. In this case and as further described below, when the services manager receives the request, it maps the application and traffic flow IDs to a default set of traffic flow characteristics that it maintains in a database, thereby providing the remaining values. The advantage of this latter method is that an application developer need not statically program the flow characteristics in the application. If at a later time it is determined that different traffic characteristics should be used for the traffic flow, an administrator need only update the database of default descriptions at the services manager.

Once the middleware API 204 is invoked to make a QoS request, the middleware control process 202 receives the request. This process is initiated prior to a given application instance requesting QoS services from system 100. When initiated, it establishes a connection 208/230, such as a TCP socket connection, to the services manager 120 and uses this connection to convey the QoS requests to the services manager on behalf of the application instances 110*a/b* and 112*a/b* requesting QoS services. Accordingly, upon receiving a QoS request from an application, the middleware process determines the user-ID/login-ID of the application user, if available, and then conveys the request and user-ID to the services manager 120 through connection 208/230.

Once the services manager receives a QoS request from an application instance via the middleware control process 202, it determines if network 106 can support the QoS request for the specified traffic flow and either denies the request or obtains a DSCP value when the request is granted. When the request is denied, the services manager informs the control process 202, which in turn informs the calling application instance. When the request is granted, the services manager 120 returns the DSCP value to the middleware control process 202, which in turn invokes the QoS configuration module 206 to perform QoS configurations at the client 102a or server 104a for the application instance.

Specifically, upon being invoked by the middleware control process, the QoS configuration module 206 issues I/O (input/output) control messages to the local operating system 218/228 (specifically, to the TCP/IP stack) instructing the operating system to configure the session for the application instance such that the DSCP field of all transmitted packets on the session are marked with the DSCP value. The control process 202 then notifies the calling application instance that the QoS configuration is complete. Accordingly, rather than reconfiguring the edge routers and burdening them with the packet-marking function, system 100 distributes this function to the traffic sources.

Once network QoS resources are allocated to a given traffic flow, the resources are released either explicitly through an application-issued request using the middleware API module 204 or automatically through the expiration of the duration specified in the QoS request. When an application instance initiates the release, the middleware control process 202 receives the request and conveys the request through connection 208/230 to the services manager 120, which reallocates the network resources. The services manager then confirms the release with the control process 202, which in turn uses the QoS configuration module 206 to issue an I/O control message to the local operating system 218/228 instructing the operating system to configure the session for the application instance such that the DSCP field of all outgoing packets is no longer marked.

Regardless of whether a release request is issued, the services manager 120 also automatically monitors the length of allocated QoS resources to a given flow based on the duration specified in the QoS request. At the end of the specified duration, if the application has not yet released the resources, the services manager automatically reallocates the allocated QoS resources and then proceeds as just described, notifying the middleware control process 202.

Turning to the services manager 120, it is a software-based system that acts as a central entity that oversees QoS management for a set of clients 102 and servers 104 communicating over network 106. FIG. 3 shows a functional architecture of the services manager, which comprises a services manager control process 302, a middleware communication module 304, a network configuration control module 306, an SLA control modules 320, a QoS manager 308, a policy manager 310, a topology manager 312, and a set of databases including a default QoS database 314, a network topology database 316, and an alternate QoS database 318.

The middleware communication module 304 manages all connections 208 and 230 between the services manager and the middleware control processes 202 at the clients 102 and servers 104, and in particular, passes QoS requests/responses between these processes and the services manager control process 302.

The services manager control process 302 oversees the processing of the application initiated QoS requests. Upon receiving a QoS request from an application, the services manager control process first interacts with the policy manager 310 to obtain a complete characterization of the traffic flow. As indicated above, rather than fully specifying the traffic flow characterization when making a QoS request, an application can leave it partially or totally unspecified, providing only an application ID and flow ID. Accordingly, the services manager control process interacts with the policy manager, which for a given application ID and flow ID maintains default traffic flow characterizations in the default QoS database 314. Again, by maintaining default characterizations at the services manager, an administrator can update the characterization for a given application and flow as needed, rather than hard-coding the characterization in the application. More importantly, an administrator can establish a set of policies that the policy manager uses to determine a default characterization for a given application ID and flow ID.

In addition to maintaining default characterizations, the default QoS database 314 can also maintain traffic flow characterizations for individual users and indexed by user-ID/logon. This allows users to individually customize the QoS that will be given to the traffic flows they each generate for a given application. Accordingly, if a user-ID/login is specified in the QoS request, the policy manager 310 also makes this determination when finalizing the traffic flow characterization for a given flow. Once having a complete traffic flow characterization, the services manager control process converts this characterization into a detailed set of low-level traffic flow attributes, uses the flow ID to determine the direction of the flow, and then passes the QoS request to the QoS manager for admission control.

The QoS manager 308 oversees the actual QoS admission to network 106 and determination of a DSCP value for a given traffic flow. In particular, upon receiving a QoS request from the services manager control process 302, the QoS manager first contacts the topology manager 312 to determine the sub-networks 106 traversed by the specified traffic flow, as indicated through the client and server's IP addresses specified in the QoS request. The topology manager maintains the network topology database 316, which includes a list of entries wherein the index to each entry is a source/destination host-IP address pair (or subnet address pair) and wherein each entry is a list of network addresses corresponding to the administrative domains over which traffic between the source and destination IP address is carried. An administrator can manually maintain the topology database 316 or preferably, the topology manager 312 can dynamically maintain the database. For example, the topology manager can periodically run the trace-route program for host or subnet address pairs and use the results to populate the database.

The QoS manager 308 provides the topology manager with the client and server IP addresses for the specified traffic flow and in response receives the network addresses of the sub-networks 106 through which the given traffic flow will move. The QoS manager then determines which sub-networks are Diff Serv enabled and in particular, determines the network configuration system 124 and/or SLA control module 320 for each of these networks. For each managed network, the QoS manager formulates a QoS admission request specifying the low-level traffic flow attributes, the direction of the traffic flow, and the client/server IP addresses. The QoS manager then issues each request to the appropriate network configuration system 124 and/or SLA control modules 320. With respect to the network configuration systems 124, these requests go through network configuration control module 306, which maps the traffic flow attributes to one of the traffic classes supported by each sub-network and then issues admission requests for these traffic classes to the network configuration systems 124. With respect to the SLA control modules 320, again, each of these modules converts the traffic flow attributes to a specific traffic class supported by its corresponding network and then performs admission control as described above.

Assuming any of the network configuration systems 124 and/or SLA control modules 320 receiving a QoS request from the QoS manager cannot admit the request, the QoS manager returns control to the services manager control process 302, informing it that the admission has been denied. When this occurs, the services manager control process interacts with the policy manager 310 to obtain an alternative characterization for the traffic flow. In particular, in addition to maintaining default characterizations, the policy manager also maintains alternative characterizations through the alternate QoS database 318, which is indexed by application ID and flow ID. If the policy manager determines an alternative set of characterizations has been defined, the services manager control process 302 maps one of these to low-level traffic flow attributes and passes these new attributes to the QoS manager 308, which again attempts to admit the request (with the intent that the traffic flow will now be mapped to traffic classes that have available bandwidth). Note that the policy manager may maintain multiple sets of alternate characterizations for a given application ID and flow ID, allowing for multiple admission attempts. If all admission attempts fail, the services manager control module notifies the calling application as described above.

However, assuming each network configuration system 124 and/or SLA control modules 320 can admit the QoS request, each returns a DSCP value corresponding to a determined traffic class to the QoS manager. The QoS manager returns to the services manager control process the DSCP value of the first Diff Serv enabled sub-network the traffic flow traverses, thereby indicating the QoS request has been admitted. The services manager control process 302 then forwards the DSCP value via the middleware communication module 304 to the middleware control process 202 on the client or server, depending on which made the request.

Note that as described above, adjacent sub-networks are presumed to be pre-configured to automatically perform packet remarking between the different traffic classes. However, system 100 can also configure the networks to perform this remarking. For example, rather than containing a list of network addresses for each host-IP address pair, the network topology database 316 can comprise a list of entries wherein the index to each entry is still a source/destination host-IP address pair but wherein each entry is a list of sub-network address pairs showing the ingress and egress IP addresses of each sub-network traversed in order to connect the corresponding host-IP address pair. Using this information and the DSCP values returned by the network configuration systems 124 and/or SLA control modules 320, the QoS manager can instruct the appropriate network configuration systems to perform these remarkings.

As indicated, the resources allocated to a given traffic flow are released either explicitly through an application-issued request or automatically through the expiration of the duration specified in the QoS request. When an application issues a release, the release is received by the services control module 302, which forwards it to the QoS module 308, which in turn issues a release to each of the network configuration systems 124 and/or SLA control modules 320 over-seeing the sub-networks 106 through which the traffic flows. Regarding the expiration of a specified duration, the services manager control module maintains timers for each admitted QoS request and automatically instructs the QoS module to release allocated QoS service upon the expiration of the timer.

Figure 4:
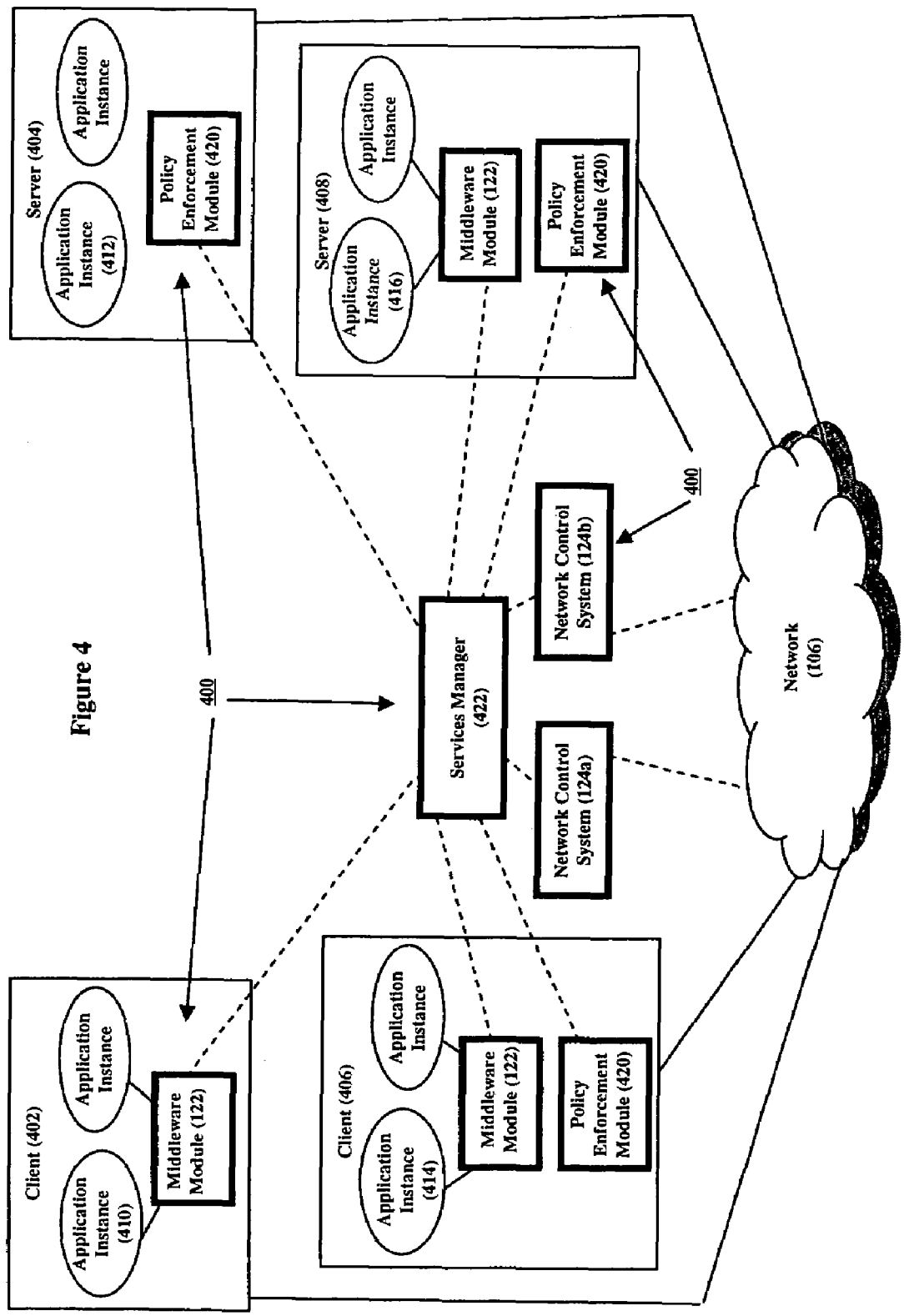
FIG. 4 depicts a block diagram of a second embodiment of our invention for provisioning QoS services on a per traffic flow basis, wherein the invention additionally comprises a policy enforcement module that allows a local application to make QoS provisioning requests for the traffic flows generated by a remote application.

As described above, system 100 allows a client or server application to make QoS requests for the traffic flows that client or server application generates. FIG. 4 is a high level illustrative diagram of a second embodiment of system 400 of our invention wherein client and server applications can continue to make QoS provisioning requests for the traffic flows each generates but can also make QoS provisioning requests for the traffic flows each receives. Similar to the first embodiment, system 400 comprises a middleware module 122 at clients and/or servers 402-406, a services manager 422, and network control systems 124. Each of these modules continues to function as described above with the services manager performing additional functions as described below. In addition, system 400 also comprises a policy enforcement module 420 at clients and/or servers, which module 420 performs DSCP marking configurations at the client/server for the traffic flows the applications at this client/server generate but wherein the module is activated by an opposing host (Note that unlike the middleware module, only a single instance of the policy enforcement module exists at a given host and serves multiple applications). The exact configuration of which clients and servers contain middleware modules 122 and policy enforcement modules 420 is not specific to this embodiment. As such, some clients and servers may contain a middleware module, a policy enforcement module, or both. The determination is essentially based on the applications any given host is running. It should also be noted that the policy enforcement module and each instance of a middleware module is independent of the other modules, even when the modules are running on the same host.

As an example of this second embodiment, consider client 402 and server 404. Here, client 402 comprises a middleware module 122 and server 404 comprises a policy enforcement module 420. Assume that application 410 at client 402 and application 412 at server 404 have an application session with client-to-server and server-to-client flows. Application 410 can make a QoS provisioning request for the client-to-server flow, with the middleware module 122 relaying the request to the services manager 422 and with the middleware module also configuring the client 402 with the obtained DSCP value for packet marking, as described above. However, application 410 can also make QoS provisioning requests for the server-to-client flow. Here, application 410 again makes a QoS provisioning request, which the middleware module 122 relaying the request to the services manager 422. Similar to above, the services manager determines traffic attributes for the flow, determines the sub-networks the traffic flow traverses, and makes QoS admission requests to the appropriate network control systems 124 and/or SLA control modules. Assuming each sub-network has sufficient bandwidth to admit the new traffic flow, the services manager obtains a DSCP value corresponding to the first sub-network the traffic flow traverses. However, rather than conveying the DSCP value back to the middleware module 122 at client 402, the services manager conveys the DSCP value to the policy enforcement module 420 at server 404. The policy enforcement module 420, upon receiving the DSCP value from the services manager, configures the server 404 to intercept the traffic flow packets generated by application 412 prior to transmission and to appropriately mark the DSCP field of the packets, completing the overall QoS configuration.

As another example, consider client 406 and server 408. Here, both the client and server comprise the middleware module 122 and the policy enforcement module 420. Again, assume that application 414 at client 406 and application 416 at server 408 have an application session with client-to-server and server-to-client flows. Here, because the client and server contain both the middleware module and policy enforcement module, application 414 can make QoS requests for the client-to-server flow and for the server-to-client flow and similarly, application 416 can make QoS requests for the server-to-client flow and for the client-to-server flow.

Figure 5:
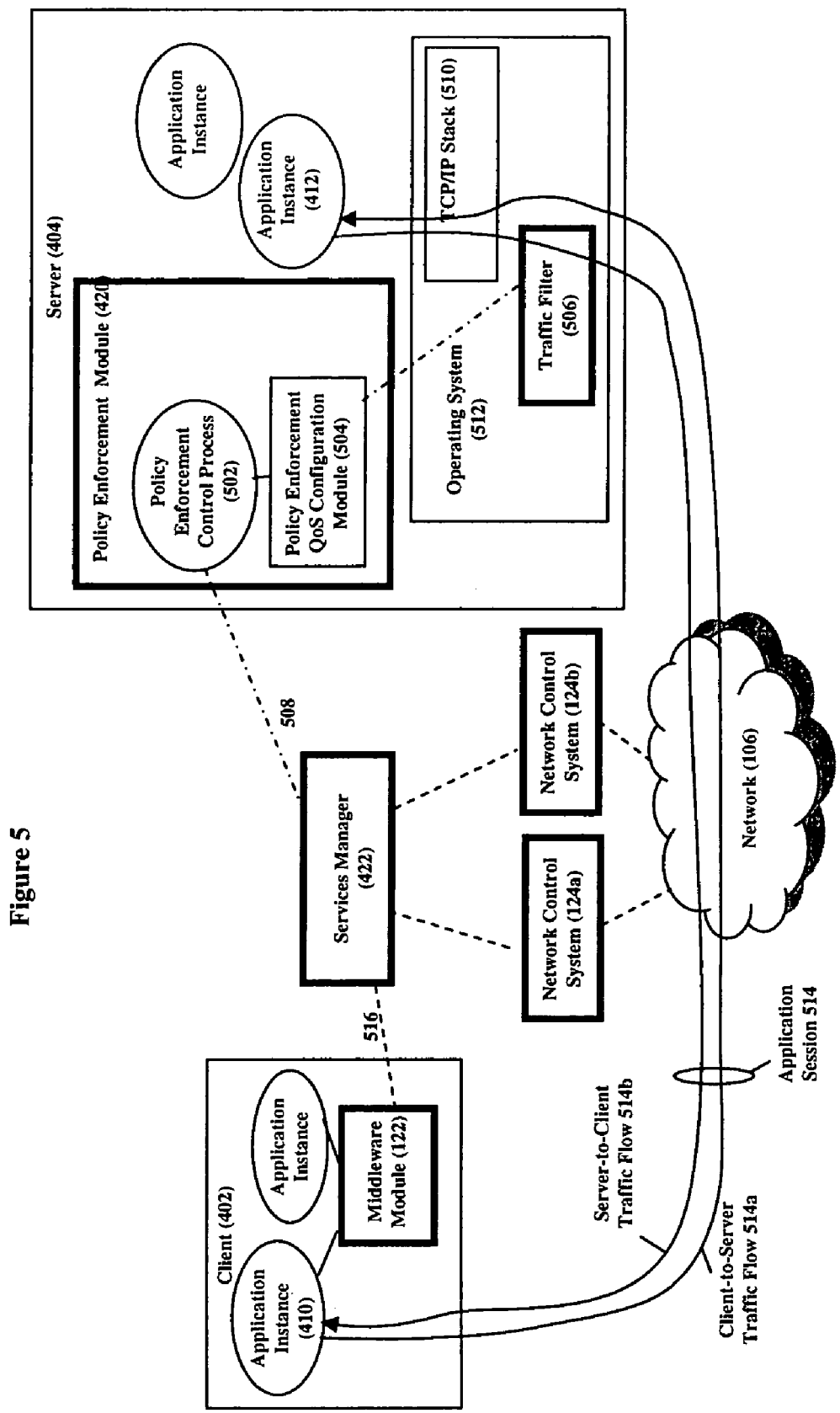
FIG. 5 is a functional drawing of the policy enforcement module as shown in FIG. 1.

Reference will now be made in greater detail to the policy enforcement module 420, with FIG. 5 showing a functional design of the module. Note that for discussion purposes, FIG. 5 uses the first example from above with client 402 comprising the middleware module 122 and with server 404 comprising the policy enforcement module 420. As shown, the policy enforcement module 420 is a software-based module and comprises a policy enforcement control process 502, a policy enforcement QoS configuration module 504, and one or more traffic filters 506. Similar to the middleware module 122, the policy enforcement module is initiated prior to any given application instance requesting QoS services from system 400.

Once a client application (such as application instance 410) establishes a session (such as session 514) to a server application (such as application instance 412), the client application uses the middleware API to request QoS services for client-to-server traffic flows (such as flow 514*a*) and/or for server-to-client traffic flows (such as flow 514*b*) occurring over the application session. Again, the application specifies an application ID and a flow ID. As the services manager receives the request from the middleware module over connection 516, it operates similar to system 100, and attempts to admit the flow to network 106. Assuming the flow is admitted and the services manager obtains a DSCP value, it determines the direction of the flow based on application/flow IDs and conveys the value to either the middleware module or policy enforcement module.

In particular, for a server-to-client flow, the services manager next establishes a connection 508, such as a TCP socket connection, to the policy enforcement control process 502 at the server 404. The services manager then communicates with the policy enforcement control process through this connection, passing it the determined DSCP value and the client/server IP addresses/port numbers of the session 514 (as provided by the middleware control process) thereby instructing the process 502 to perform a packet-marking configuration.

In general, the policy enforcement control process 502 performs the packet-marking configuration by invoking the policy enforcement QOS configuration module 504, which configures the local operating system 512 to mark the DSCP field of all outgoing packets on the server-to-client traffic flow 514*b*. Specifically, one way the policy enforcement QOS configuration module 504 performs this configuration is to install a traffic filter 506 that resides within the operating system kernel 512 below the TCP/IP stack 510 and that filters on the source/destination IP address and port number information of transmitted packets, capturing all packets corresponding to traffic flow 514*b*. As the desired packets are captured, the traffic filter marks the DSCP field with the specified DSCP value and then retransmits the packets onto network 106. The traffic filter capability can be implemented using the Solaris Bandwidth Manager for hosts running the Solaris Operating System or using the Windows XXX for hosts running the Windows Operating System. Note that the services manager similarly communicates with the policy enforcement control process 502 to remove the traffic filter when instructed through a remove request or when a duration timer expires.

Reference will now be made to a third embodiment of our invention where in addition to the clients and servers performing the packet marking function, the clients and servers also can perform the packet policing and shaping functions for the traffic flows they generate. Similar to the first embodiment, this embodiment comprises a middleware module at the clients and/or servers, a services manager, and network control systems. Each of these modules continues to function as described above with respect to the first embodiment. In addition, like the second embodiment, this third embodiment can also comprise a policy enforcement module at remote hosts that is used by local hosts to make QoS requests for the traffic flows the remote host generates. However, in accordance with this third embodiment, this policy enforcement module also performs the packet policing and packet shaping functions for the traffic flows the remote host generates. In addition, in the case where a local host is making QoS requests for the traffic flows it directly generates, this third embodiment adds a policy enforcement module to the local host that performs the packet policing and packet shaping functions for these traffic flows.

Figure 6:
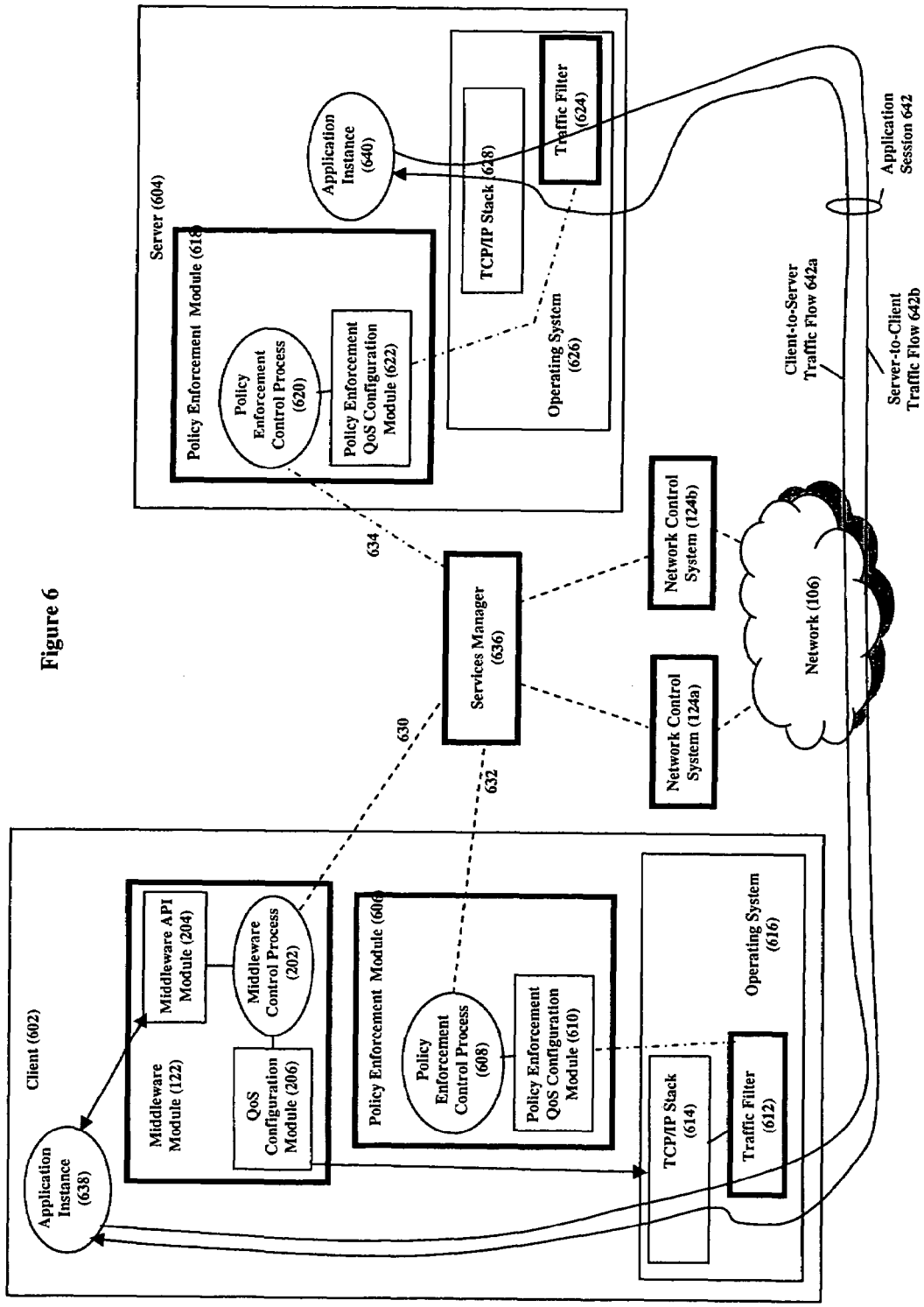
FIG. 6 depicts a functional diagram of a third embodiment of our invention for provisioning QoS services on a per traffic flow basis wherein in addition to packet marking functions as in the first and second embodiments, packet policing and packet shaping functions are also conducted at client and server hosts.

FIG. 6 is an exemplary configuration of the third embodiment that illustrates the functional operation of packet shaping and packet policing. As shown, client 602 comprises a middleware module 122 and server 604 comprises a policy enforcement module 618 thereby allowing a client-based application (such as application instance 638) to establish a session (such as application session 642) to a server-based application (such as application instance 640) and to make QoS requests for client-to-server traffic flows (such as traffic flow 642*a*) and for server-to-client traffic flows (such as traffic flow 642*b*) as described above. With respect to the server-to-client flows, the policy enforcement module 618 at server 604 continues to perform the packet marking function. However, this module now also performs the packet shaping and policing function for these flows. With respect to the client-to-server flows, the middleware module 122 at the client 602 continues to perform the packet marking function. However, for the packet policing and shaping functions with respect to these flows, a policy enforcement module 606 is now also needed at the client 602.

More specifically, with respect to the server-to-client flows, application 638 makes a QoS request to the middleware module 122, which conveys the request to the services manager 636 over connection 630. Once the services manager 636 obtains a DSCP value for the requested flow, it establishes a connection 634 to the policy enforcement control process 620 at server 604 and passes it the DSCP value and the client/server IP addresses/port numbers of the session 642 as described above. However, it also conveys rate control information for the policing and shaping of the traffic flow 642*b*. The policy enforcement control process 620 then invokes the policy enforcement QOS configuration module 622 to perform the packet marking and rate control configuration for the traffic flow. Again, one way the policy enforcement QOS configuration module 622 can do this is to install a traffic filter 624 that resides within the operating system kernel 626 below the TCP/IP stack 628 and that filters on the source/destination IP address and port number information of transmitted packets, capturing all packets corresponding to traffic flow 642*b*. As the desired packets are captured, the traffic filter marks the DSCP field with the specified DSCP value and then retransmits the packets onto network 106 in accordance with the specified rate control information.

With respect to client-to-server flows, application 638 makes a QoS request to the middleware module 122, which conveys the request to the services manager 636 over connection 630. Once the services manager 636 obtains a DSCP value for the requested flow, it coveys the value to the middleware control process 202 over connection 630, which in turn uses the QoS configuration module 206 to configure the local operating system 616 to mark the DSCP field of all outgoing packets on the traffic flow 642a, as described above. However, in addition, the services manager 636 also establishes an additional connection 632, such as a TCP socket connection, to the policy enforcement control process 608. The services manager then conveys to the policy enforcement control process rate control information (for policing and shaping) and the client/server IP addresses/port numbers of the session 642. The policy enforcement control process 608 in turn invokes the policy enforcement QOS configuration module 610 to configure the local operating system 616 to perform the rate control functions on the outgoing packets of the client-to-server traffic flow 642a. Specifically, one way the policy enforcement control process can do this is to install a traffic filter 612 that resides within the operating system kernel 616 below the TCP/IP stack 612 and that filters on the source/destination IP address and port number information of transmitted packets, capturing all packets corresponding to traffic flow 642a. As the desired packets are captured, the traffic filter retransmits the packets onto network 106 in accordance with the specified rate control information. Again, the traffic filter capability can be implemented using the Solaris Bandwidth Manager for clients running the Solaris Operating System or using the Windows XXX for clients running the Windows Operating System.

Figure 7:
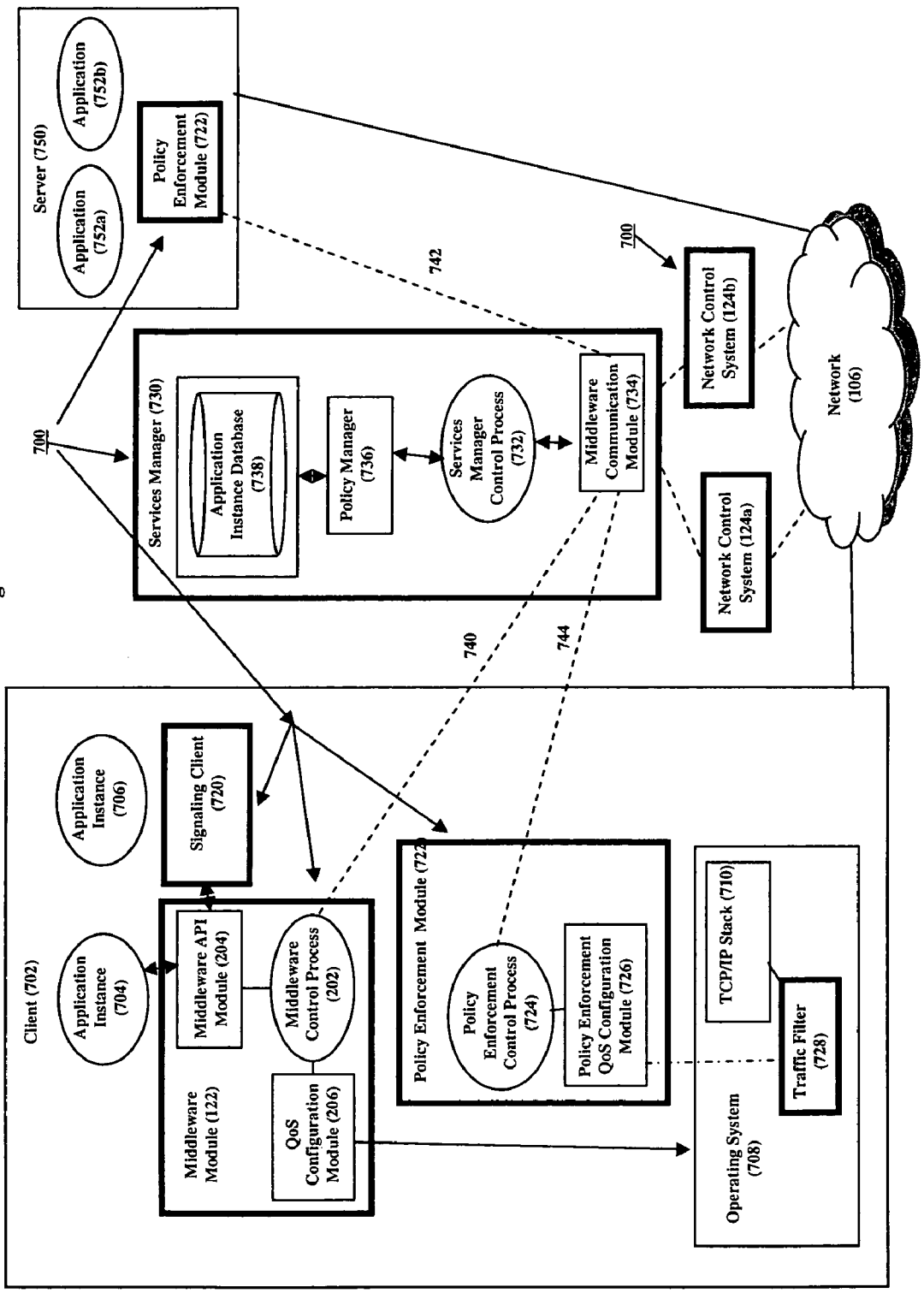
FIG. 7 depicts a functional diagram of a fourth embodiment of our invention for provisioning QoS services on a per traffic flow basis, wherein users communicate with a signaling client to make the provisioning requests on behalf of the client and server applications.

FIG. 7 is an illustrative diagram of a fourth embodiment of system 700 of our invention that provisions end-to-end QoS services on a per application flow basis. As described above, under the first three embodiments of our invention applications are modified to include the middleware API 204 in order to directly control the QoS requests for a given application session and traffic flows. System 700 continues to support this function (as shown by application instance 704) but, in addition, allows a user to make QoS requests for application sessions and traffic flows wherein the application itself, such as application instance 706, is not modified to include the middleware API. This allows users to make QoS requests for legacy applications, for example. Note that for discussion purposes, FIG. 7 is only one exemplary configuration of system 700 for the purpose of showing the functional operation of how a user can directly initiate QoS requests for client-to-server and server-to-client traffic flows. However, it is readily apparent that this embodiment can also be combined with the first three embodiments described above.

System 700 comprises a services manager 730 and one or more network control systems 124a-b that operate as described above, overseeing the QoS management for network 106 on behalf of clients and servers. In addition, system 700 comprises a signaling client 720 and a middleware module 122 that operate together to allow a user to make the QoS requests for client-to-server and server-to-client flows. (As indicated, the middleware module can also continue to operate directly with applications.) Typically, the signaling client/middleware module will be located at the client side of a communication, which assumption is made in the following discussion and is shown in FIG. 7 for description purposes. However, again, other configurations are possible. When the signaling client is used to make QoS requests, the middleware module can no longer perform the packet marking function for locally generated traffic flows. As such, system 700 also comprises the policy enforcement module 722 at both local and remote hosts, which module performs the packet marking (and policing/shaping functions) whenever the signaling client 720 is used to initiate QoS requests. Hence, a policy enforcement module 722 is essentially located at any client and server generating traffic flows for which a user wants to make QoS requests. Lastly, the services manager 730 of system 700 comprises an application instance database 738 and a modified services manager control process 732, a modified middleware communication module 734, and a modified policy manager 736 as compared to the first three embodiments. (The remaining elements of services manager 730 are the same as the services manager as described in reference to FIG. 3 and are not shown in FIG. 7 for simplicity.)

In accordance with system 700, a user uses signaling client 720 to make QoS requests for application sessions and traffic flows corresponding to applications that are not modified to include the middleware API 204, such as application instance 706 at client 702. Here, the signaling client 720, which is independent of the applications, includes the middleware API and based on user initiation, conveys a QoS request for a particular application session/traffic flow to the services manager 730 via the middleware module 122 and connection 740. If the flow is admitted, the services manager obtains a DSCP value and determines the direction of the flow. For server-to-client flows, the services manager conveys the DSCP value to the policy enforcement module 722 at server 750, similar to above. However, for client-to-server traffic flows, the middleware module is not able to perform the necessary QoS configurations at the client 702. Accordingly, the services manger establishes a new connection 744 to the policy enforcement module 722 at the client 702 and conveys the DSCP value to this process. The policy enforcement module 722 then operates like the policy enforcement module described in reference to the second and third embodiments, configuring the client 702 to mark the packets and possibly perform rate control functions for a client-to-server traffic flow.

More specifically, the signaling client 720 is configured to present to a user (e.g., through a GUI (graphical user interface)) a list of applications for which the user can control QoS services. The signaling client may obtain this list, for example, from a database. Accordingly, once a client and server application have started an application session, a user can select a corresponding application at the signaling client, indicating that the user wants to make QoS requests for the traffic flows occurring between the client and server applications (Similarly, the user can designate that the QoS services should be released.). Once a user invokes the QoS services, the signaling client uses the middleware API 204 to make QoS requests (and QoS release requests) to the middleware module 122. Like above, these requests include an application ID and a flow ID and preferably exclude the characterizations of the traffic flows, allowing the services manager 730 to provide these values. However, traffic flow characterizations can also be hard-coded in the signaling client, could be obtained from a local database, or could be specified by the user through a GUI, for example. Nonetheless, while the signaling client 720 may know one of the IP addresses corresponding to the application session, most likely the client 702 IP address, unlike the first three embodiments the signaling client does not know the server 704 IP address or the source/destination port numbers of the application session for which it is requesting QoS services. This is because the signaling client is running separate from the applications.

Accordingly, the signaling client leaves unspecified the unknown IP addresses and port numbers. However, as a further option, the user could specify the server host name to the signaling client, which the signaling can convert to an IP address.

Recall that the client/server IP addresses and port numbers are important for two reasons. First, the services manager 730 needs the IP addresses to determine the sub-networks the traffic flow between the client and server will traverse. Second, for server-to-client traffic flows, the services manager needs to know the server so that it can establish a connection 742 to the policy enforcement module 722 at the server 750, for example, in order to instruct the module to configure an appropriate traffic filter to mark the outgoing traffic flow packets.

Once the signaling client makes a QoS request, the middleware control process 202 passes the request, and a user ID, to the services manager 730 via connection 740 where the middleware communications module 734 receives the request and passes it to the services manager control process 732. Again, the control process interacts with the policy manager 736 to obtain a default and/or user-specific traffic flow characterization as described above. In addition, if the user does not specify the server host name, the control process also interacts with the policy manager 736 to determine the server IP address and possibly the port number of the session (for well-known port numbers). In particular, in accordance with system 700, the policy manager maintains an applications instance database 738, which contains a default set of IP addresses and well-known port numbers indexed by application ID and flow ID (again, with reference to FIG. 7, the database would comprise default server IP addresses). Again, this is necessary because unlike the above embodiments, the signaling client cannot specify the complete endpoints of the session.

At this point, the services manager control process 732 has a complete description of the QoS request (i.e., traffic flow characterization and the endpoints of the session) and proceeds as above, passing the QoS request to the QoS manager 308. Assuming the QoS request is admitted, for server-to-client traffic flows the control process 732 establishes the connection 742 to the policy enforcement module 722 via the middleware communication module 734 and passes the module the DSCP value (and possibly rate configuration information). Note that because at least the client side port number of the traffic flow is unknown, the traffic filter the policy enforcement module installs is broader than under the prior embodiments.

For client-to-server flows, the control process 732 proceeds similar to server-to-client flows. Again, system 700 does not know the client side port number of the session. As such, unlike the prior embodiments the middleware control process 202 cannot determine the session at the client 702 and therefore cannot invoke the QoS configuration module 206 to configure the local operating system 708 to configure the session to mark the outgoing packets with the DSCP value. Accordingly, the control process 732 establishes an additional connection 744 to the policy enforcement control process 722 via the middleware communication module 734 and passes the process the DSCP value, the client and server IP addresses, possibly the server port number, and possibly rate configuration information.

Similar to above, the policy enforcement control process 724 performs the packet-marking/rate configuration by invoking the policy enforcement QOS configuration module 726, which configures the local operating system 708 to mark the DSCP field all outgoing packets on the client-to-server traffic flow. Again, one way the policy enforcement control process does this is to install a traffic filter 728 that resides within the operating system kernel 708 below the IP stack 710 and that captures all packets on the flow.

The above-described embodiments of our invention are intended to be illustrative only. Numerous other embodiments may be devised by those skilled in the art without departing from the spirit and scope of our invention.

We claim:

1. A system for managing quality of service (QoS) for traffic flows generated by a plurality of hosts separated by one or more networks, wherein at least one of the networks is enabled with a set of traffic classes, said system comprising:
   a services manager; and
   a middleware module at least one host of the plurality of hosts, wherein said middleware module at the at least one host receives a QoS request for a traffic flow that the at least one host generates and conveys a QoS provisioning request to the services manager upon receiving the QoS request for the traffic flow;
   wherein said services manager receives the QoS provisioning request from said middleware module, obtains a DSCP (Differentiated Services Code Point) value for the traffic flow only if it is determined that the networks the traffic flow traverses can support the traffic flow, and if the DSCP value is obtained, conveys the obtained DSCP value for the traffic flow to said middleware module;
   wherein said middleware module uses the obtained DSCP value received from the services manager to mark a DSCP field of packets of the traffic flow;
   wherein the services manager, upon receiving the QoS provisioning request, determines the networks the traffic flow traverses, and as part of obtaining the DSCP value further determines, for each traffic class enabled network that the traffic flow traverses, if there is sufficient bandwidth in a traffic class to support the traffic flow;
   wherein the QoS request contains an identification of the traffic flow and wherein the middleware module conveys the identification to the services manager as part of the QoS provisioning request;
   wherein the services manager, upon receiving the QoS provisioning request, determines a default traffic flow characterization for the traffic flow based on the identification of the traffic flow, and uses the default traffic flow characterization to obtain the DSCP value by determining if the networks the traffic flow traverses can support the flow based on the default traffic flow characterization; and
   wherein if the services manager cannot obtain the DSCP value based on the determined default traffic flow characterization, the services manager determines an alternate traffic flow characterization for the traffic flow based on the identification of the traffic flow, and uses the determined alternate traffic flow characterization to obtain the DSCP value by determining if the networks the traffic flow traverses can support the flow based on the alternate traffic flow characterization.

2. The system of claim 1, further comprising a policy enforcement module at least one host of the plurality of hosts, wherein the at least one host containing the policy enforcement module generates a second traffic flow, and wherein:
   said middleware module receives a second QoS request for the second traffic flow and conveys a second QoS provisioning request to the services manager upon receiving the second QoS request for the second traffic flow;
   said services manager obtains a second DSCP value for the second traffic flow if the networks the second traffic flow traverses can support the second traffic flow, and if the second DSCP value is obtained, conveys the obtained second DSCP value for the second traffic flow to the policy enforcement module; and wherein said policy enforcement module uses the obtained second DSCP value received from the services manager to mark the DSCP field of packets of the second traffic flow.

3. The system of claim 2, wherein the services manager further conveys, when the second DSCP value is obtained for the second traffic flow, packet policing and packet shaping instructions to the policy enforcement module, and wherein the policy enforcement module uses the packet policing and packet shaping instructions received from the services manager to police and shape the packets of the second traffic flow.

4. The system of claim 1, further comprising a policy enforcement module at the at least one host, wherein:
when the DSCP value is obtained for the traffic flow, said services manager further conveys packet policing and packet shaping instructions to the policy enforcement module; and
wherein the policy enforcement module uses the packet policing and packet shaping instructions received from the services manager to police and shape the packets of the traffic flow.

5. A system at a host for managing quality of service (QoS) for a plurality of traffic flows traversing one or more networks, wherein at least one of the networks is enabled with a set of traffic classes, said system comprising:
a signaling client for generating QoS provisioning requests for one or more of the plurality of traffic flows;
a middleware control module for receiving the QoS provisioning requests and for conveying the QoS provisioning requests to a services manager configured to obtain a DSCP (Differentiated Services Code Point) value that corresponds to a determined network that is traffic class enabled and is the first network a given traffic flow traverses; and
a policy enforcement module for receiving DSCP values for the one or more of the plurality of traffic flows that are generated by the host, wherein said policy enforcement module uses the DSCP values to mark transmitted packets corresponding to the one or more of the plurality of traffic flows that are generated by the host;
wherein the services manager, upon receiving the QoS provisioning requests, determines the networks that the given traffic flow traverses, and as part of obtaining the DSCP values further determines, for each traffic class enabled network that the given traffic flow traverses, if there is sufficient bandwidth in a traffic class to support the given traffic flow;
wherein the QoS provisioning requests contain identifications of the traffic flows, and wherein the middleware module conveys the identifications to the services manager as part of the QoS provisioning request;
wherein the services manager, upon receiving the QoS provisioning requests, determines default traffic flow characterizations for the traffic flows based on the traffic flow identifications, and uses the default traffic flow characterizations to obtain the DSCP values by determining if the networks the traffic flows traverse can support the traffic flows based on the default traffic flow characterizations; and
wherein if the services manager cannot obtain the DSCP value based on the determined default traffic flow characterizations, the services manager determines alternate traffic flow characterizations for the traffic flows based on the identifications of the traffic flows, and uses the determined alternate traffic flow characterizations to obtain the DSCP values by determining if the networks the traffic flows traverse can support the traffic flows based on the alternate traffic flow characterization.

6. The system of claim 5, wherein the policy enforcement module further configures the host to perform packet policing and packet shaping of the transmitted packets corresponding to the one or more of the plurality of traffic flows that are generated by the host.

7. A method for managing quality of service (QoS) for traffic flows generated by a plurality of hosts interconnected by one or more networkss wherein at least one of the networks is enabled with a set of traffic classes, said method comprising:
receiving, at a services manager, a QoS provisioning request from a middleware module for any given traffic flow;
determining traffic attributes for the given traffic flow;
obtaining a DSCP (Differentiated Services Code Point) value for the given traffic flow based on whether the networks the traffic flow traverses can support the given traffic flow given the determined traffic attributes; and
conveying the obtained DSCP value to a first of two hosts when the given traffic flow is from a first host to a second host;
wherein the services manager, upon receiving the QoS provisioning request, determines the networks that the given traffic flow traverses, and as part of obtaining the DSCP value further determines, for each traffic class enabled network that the given traffic flow traverses, if there is sufficient bandwidth in a traffic class to support the given traffic flow;
wherein a QoS request received by the middleware module contains an identification of the given traffic flow, and wherein the middleware module conveys the identification to the services manager as part of the QoS provisioning request;
wherein the services manager, upon receiving the QoS provisioning request, determines a default traffic flow characterization for the given traffic flow based on the identification, and uses the default traffic flow characterization to obtain the DSCP value by determining if the networks that the given traffic flow traverses can support the given traffic flow based on the default traffic flow characterization;
wherein if the services manager cannot obtain the DSCP value based on the determined default traffic flow characterization, the services manager determines an alternate traffic flow characterization for the given traffic flow based on the identification, and uses the determined alternate traffic flow characterization to obtain the DSCP value by determining if the networks that the given traffic flow traverses can support the given traffic flow based on the alternate traffic flow characterization.

8. The method of claim 7, further comprising conveying the obtained DSCP value to the second host when the given traffic flow is from the second host to the first host.

9. The method of claim 7, wherein the obtained DSCP value corresponds to a network that the given traffic flow traverses.

10. The method of claim 7, wherein determining the traffic attributes comprises:
converting the default traffic flow characterization into the traffic attributes.

11. The method of claim 10, comprising further steps executed in the event the DSCP value is not obtained given the determined traffic attributes, said further steps comprising:

converting the default traffic flow characterization into alternate traffic attributes; and obtaining the DSCP value for the given traffic flow based on whether the networks that the given traffic flow traverses can support the given traffic flow given the determined alternate traffic attributes.

12. A method executed by a first host for managing quality of service (QoS) for a plurality of traffic flows traversing one or more networks, wherein at least one of the networks is enabled with a set of traffic classes, said method comprising:

receiving, at a middleware module at a client device, a QoS provisioning request for any given traffic flow;

conveying the QoS provisioning request from the middleware module at the client device to a services manager configured to determine which of the one or more networks the given traffic flow traverses and for obtaining a DSCP (Differentiated Services Code Point) value corresponding to a determined network that is traffic class enabled and is the first network the given traffic flow traverses;

receiving the DSCP value when the given traffic flow is generated by the host; and marking transmitted packets of the given traffic flow at the client device with the DSCP value;

wherein the services manager, upon receiving the QoS provisioning request, determines the networks that the given traffic flow traverses, and as part of obtaining the DSCP value further determines, for each traffic class enabled network that the given traffic flow traverses, if there is sufficient bandwidth in a traffic class to support the given traffic flow;

wherein the QoS provisioning request received by the middleware module contains an identification of the given traffic flow, and wherein the middleware module conveys the identification to the services manager as part of the QoS provisioning request;

wherein the services manager, upon receiving the QoS provisioning request, determines a default traffic flow characterization for the given traffic flow based on the identification, and uses the default traffic flow characterization to obtain the DSCP value by determining if the networks that the given traffic flow traverses can support the given traffic flow based on the default traffic flow characterization;

wherein if the services manager cannot obtain the DSCP value based on the determined default traffic flow characterization, the services manager determines an alternate traffic flow characterization for the given traffic flow based on the identification, and uses the determined alternate traffic flow characterization to obtain the DSCP value by determining if the networks that the given traffic flow traverses can support the given traffic flow based on the alternate traffic flow characterization.

13. The method of claim 12, further comprising policing and shaping the transmitted packets of the given traffic flow with the DSCP value.

* * * * *

UNITED STATES PATENT AND TRADEMARK OFFICE
CERTIFICATE OF CORRECTION

PATENT NO.        : 7,698,457 B2                                              Page 1 of 1
APPLICATION NO.   : 10/706796
DATED             : April 13, 2010
INVENTOR(S)       : Andrei Ghetie et al.

It is certified that error appears in the above-identified patent and that said Letters Patent is hereby corrected as shown below:

IN THE CLAIMS

Claim 7, Col. 24, Line 12:

Delete the word "networkss" and replace with --networks,--

Signed and Sealed this

Eighth Day of June, 2010

David J. Kappos
*Director of the United States Patent and Trademark Office*